United States Patent
Nguyen

(10) Patent No.: US 6,604,864 B2
(45) Date of Patent: Aug. 12, 2003

(54) OPTIC FIBER CONNECTOR SPRING RETAINER

(75) Inventor: Can Trong Nguyen, Garden Grove, CA (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 211 days.

(21) Appl. No.: 09/837,774

(22) Filed: Apr. 17, 2001

(65) Prior Publication Data

US 2002/0150348 A1 Oct. 17, 2002

(51) Int. Cl.[7] .................................................. G02B 6/38
(52) U.S. Cl. .......................................... 385/59; 439/700
(58) Field of Search .............................. 385/59, 69, 79, 385/86; 439/352, 700

(56) References Cited

U.S. PATENT DOCUMENTS

| | | | |
|---|---|---|---|
| 4,076,379 A | | 2/1978 | Chouinard |
| 4,082,421 A | | 4/1978 | Auracher et al. |
| 4,140,366 A | | 2/1979 | Makuch et al. |
| 4,140,367 A | | 2/1979 | Makuch et al. |
| 4,182,546 A | | 1/1980 | Lukas et al. |
| 4,690,494 A | * | 9/1987 | Hirose et al. ................. 385/60 |
| 5,265,182 A | * | 11/1993 | Hartley ........................ 385/59 |
| 5,283,848 A | | 2/1994 | Abendschein et al. |
| 5,373,573 A | * | 12/1994 | Welsh ......................... 385/69 |
| 5,428,703 A | * | 6/1995 | Lee ............................. 385/78 |
| 5,590,229 A | * | 12/1996 | Goldman et al. ............. 385/59 |
| 5,689,598 A | | 11/1997 | Dean, Jr. et al. |
| 5,778,121 A | | 7/1998 | Hyzin |
| 5,898,807 A | | 4/1999 | Welsh |

* cited by examiner

Primary Examiner—Lynn Feild
Assistant Examiner—Brian S. Webb
(74) Attorney, Agent, or Firm—Roger C. Turner

(57) ABSTRACT

A retainer (60) at the rear of each passage (14) that holds an optical fiber terminus (30), abuts the rear end (62) of a spring to normally retain the terminus while allowing its removal, with the retainer being rugged, easily manipulated, and of small diameter to allow numerous passages to lie close together. Each retainer has a primarily cylindrical outer surface (74) but with a pair of projections (80, 82). The rear portion of the passage has a first part (90) through which the retainer can be slid forwardly while the retainer is in an initial rotational orientation. A third passage part (94) receives the retainer and allows it to be turned from the initial orientation (60A) to a lock rotational orientation (60B). A second passage part (92) that lies between the first and third passage parts, allows the projections to move rearwardly into recesses (112) that prevent rotation of the retainer and that have forwardly-facing shoulders (114) that abut the retainer to limit its rearward movement.

13 Claims, 4 Drawing Sheets

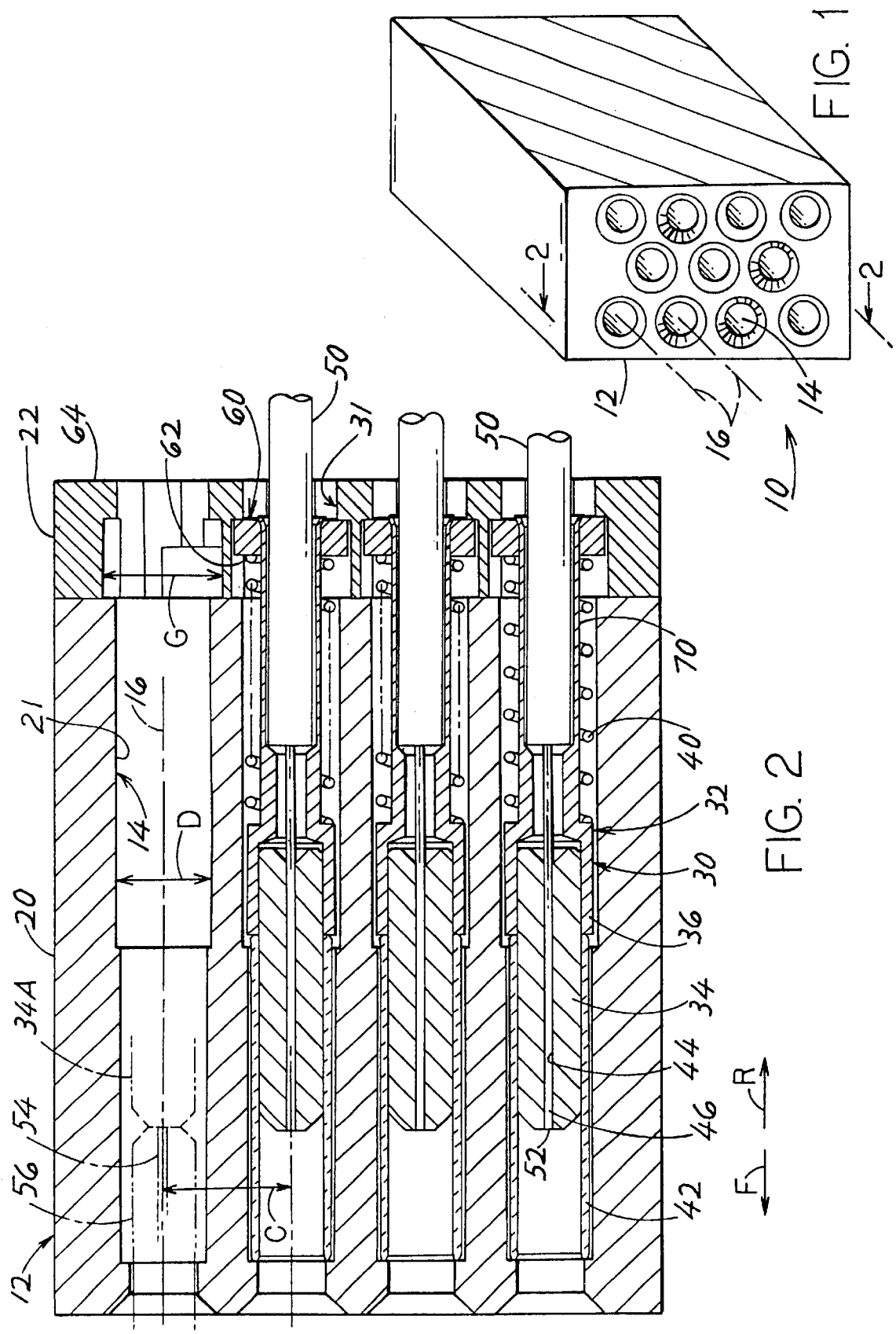

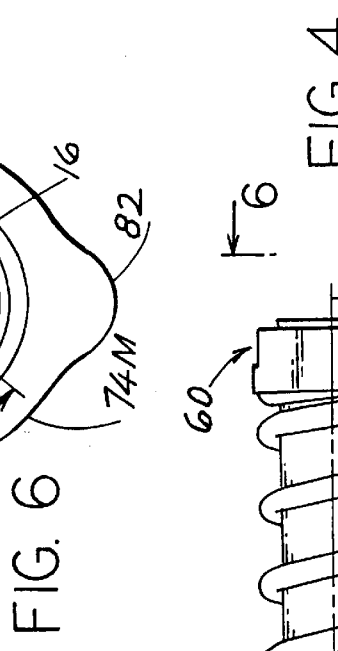
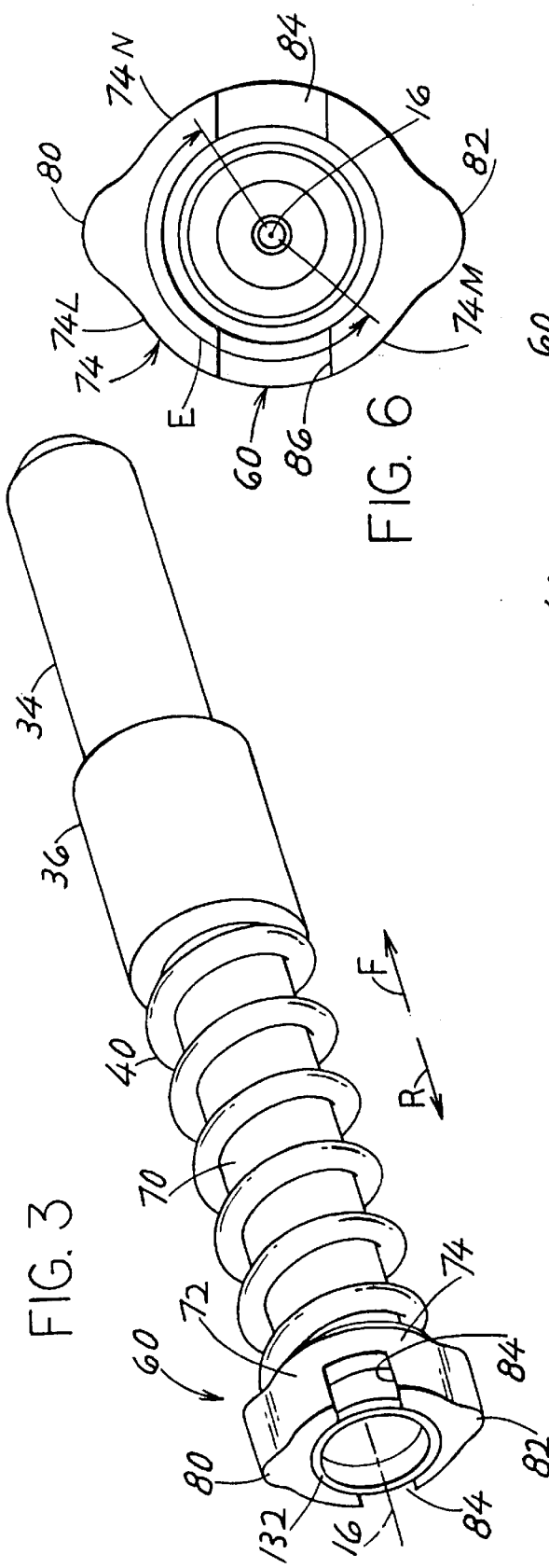
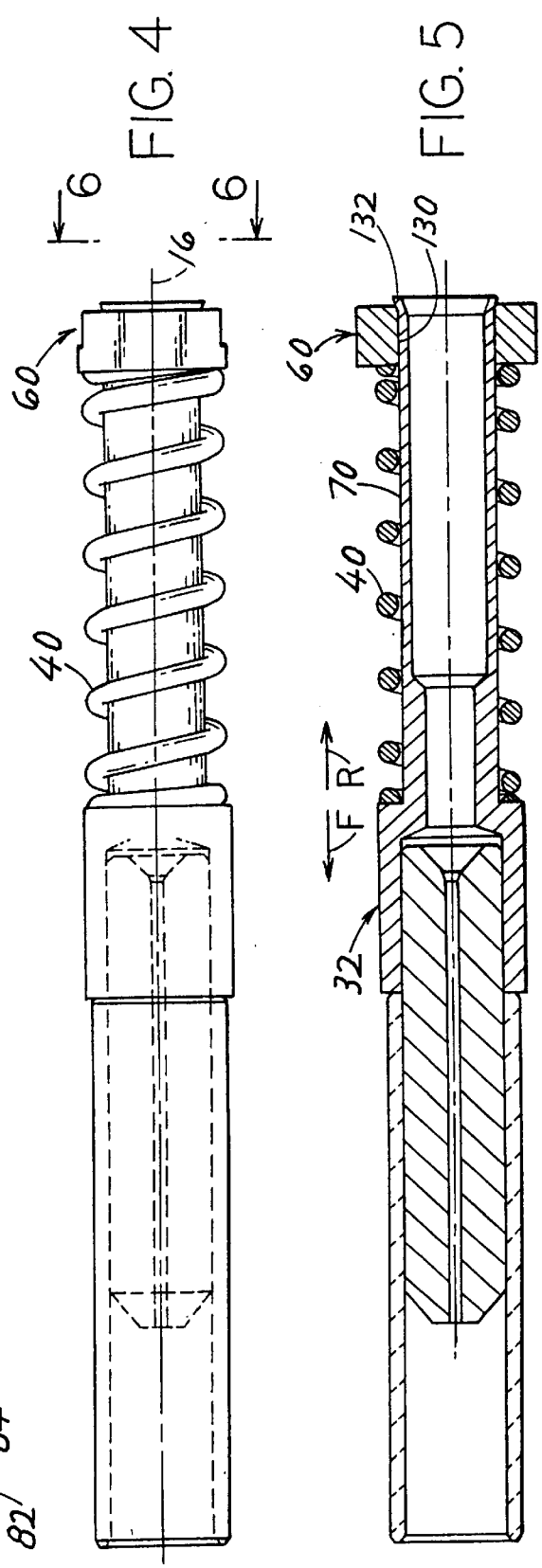

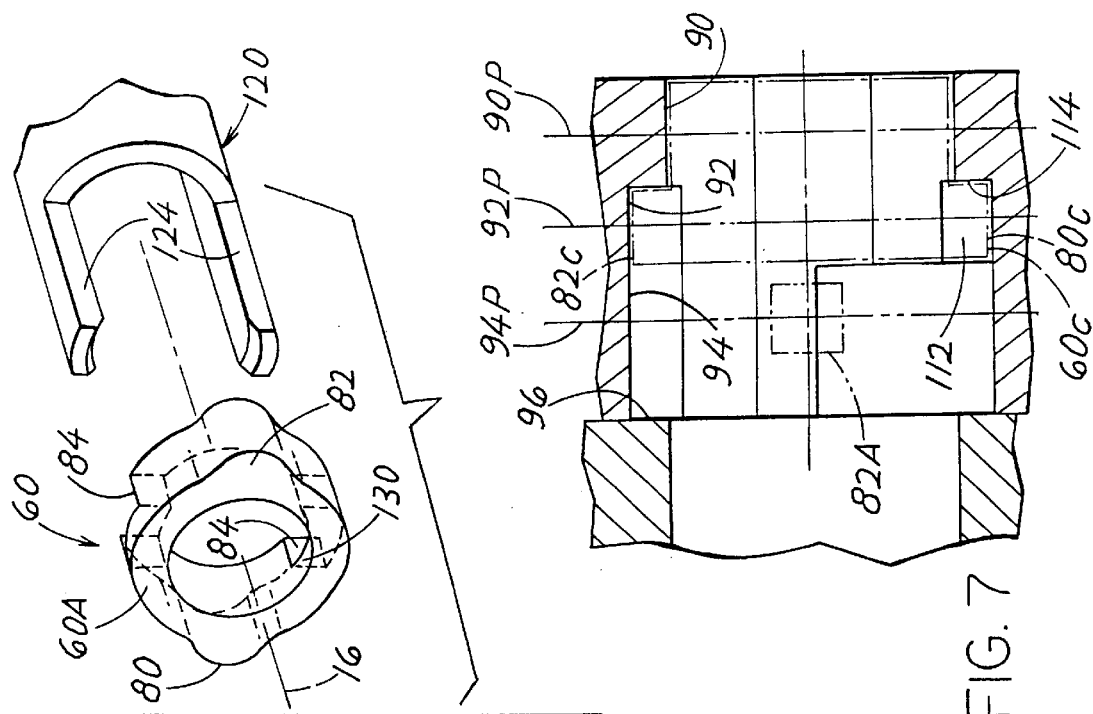
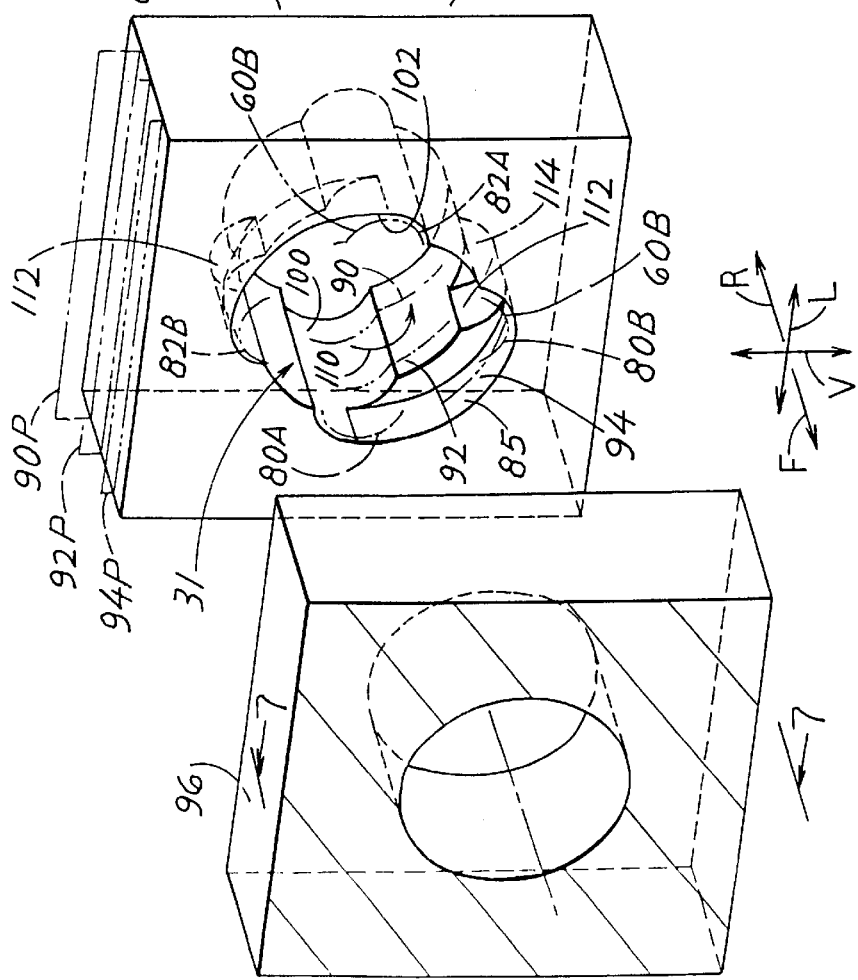
FIG. 7
FIG. 8

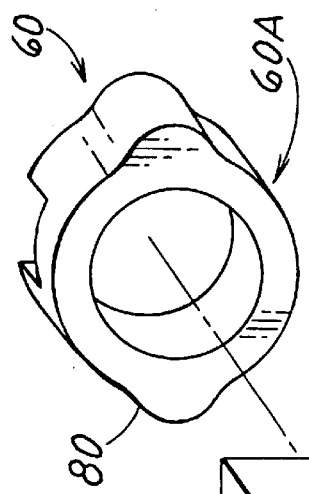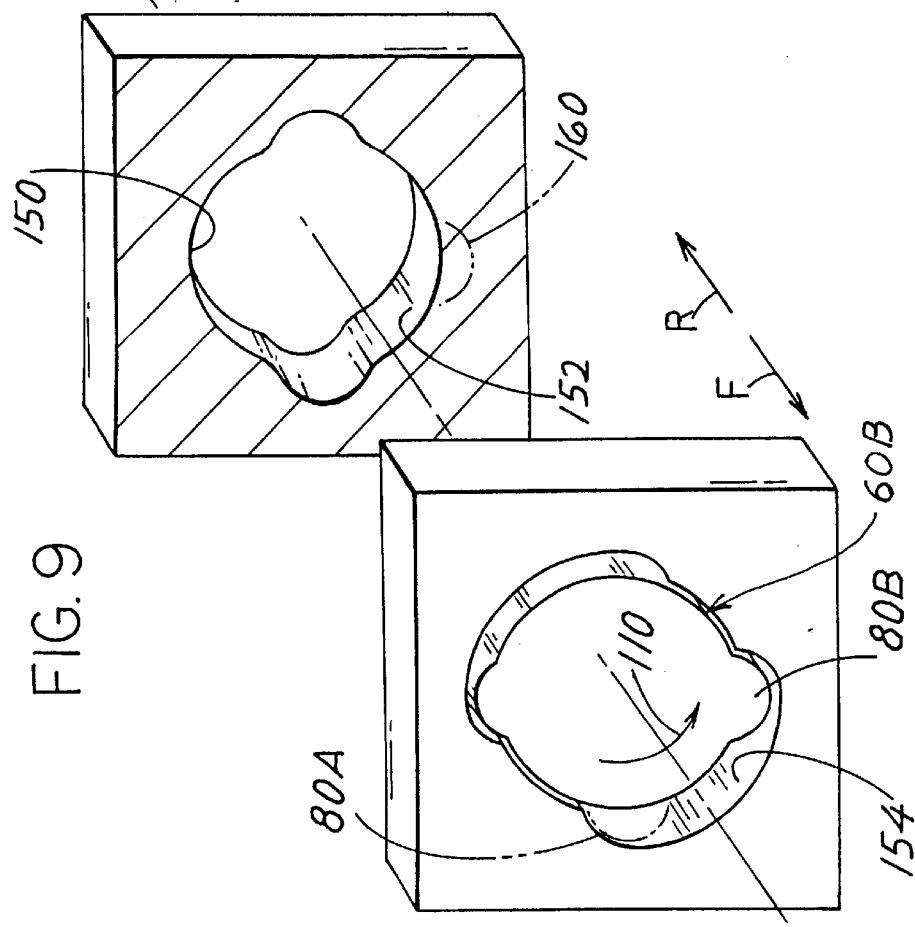
FIG. 9
FIG. 10

OPTIC FIBER CONNECTOR SPRING RETAINER

BACKGROUND OF THE INVENTION

In the prior art, fiber optic termini are retained in passages of connectors in the same manner as prior electrical connectors, by means of retaining clips. The retaining clip requires the terminus-receiving passage to have an enlargement forming a forwardly-facing shoulder that abuts the rear end of the clip. The clip has tines that extend at forward and radially-inward inclines to engage a shoulder on the terminus. The installation and removal of each clip is a delicate operation because of the thin deep space that the clip must be installed in or removed from. The use of such clips adds complication to the manufacture of the passages and termini because of the need to form shoulders in the passages and on the termini. Also, the increased diameter passage part for receiving the clip results in the need for greater spacing between the passages, resulting in a larger connector. A retainer that was rugged, allowed simpler termini construction, and allowed close spacing of termini-holding passages in a connector, would be of value.

SUMMARY OF THE INVENTION

In accordance with one embodiment of the present invention, a connector is provided with a frame having a passage, a terminus in the passage, and a retainer at the rear of the passage that retains the terminus in the passage. The retainer can be rotationally oriented in an initial position wherein it can be slid forwardly through a rear or first passage part to a third passage part where the retainer can be turned to a lock rotational position. In the lock position, the retainer cannot move rearwardly out of the passage. The rear passage portion has a second passage part lying between the first and third passage parts. The second passage part allows limited rearward movement of the retainer when it lies in its lock position. The second passage part has projection-receiving recesses that prevent rotation of the retainer when its projections lie in the second passage part, with the retainer being urged to remain in the second passage part by a spring of the terminus.

The retainer outer surface is preferably largely cylindrical, with the projections projecting only limited radial distances outward from the cylindrical surfaces. As a result, the rear passage portion can be of limited diameter to allow adjacent passages to lie close together so the connector can hold termini at a high density.

The novel features of the invention are set forth with particularity in the appended claims. The invention will be best understood from the following description when read in conjunction with the accompanying drawings.

BRIEF DESCRIPTION OF THE DRAWINGS

FIG. 1 is a front isometric view of a portion of an optical connector constructed in accordance with one embodiment of the invention.

FIG. 2 is a sectional view taken on line 2—2 of FIG. 1.

FIG. 3 is a rear isometric view of one of the termini in the connector of FIG. 2.

FIG. 4 is a slide elevation view of the terminus of FIG. 3.

FIG. 5 is a sectional view taken on the axis of the terminus of FIG. 4.

FIG. 6 is a rear elevation view taken on line 6—6 of FIG. 5.

FIG. 7 is an enlarged view of a portion of the connector of FIG. 2, showing the frame rear passage portion.

FIG. 8 is an exploded view of the walls of the passage portion of FIG. 7, and showing a retainer and a retainer insertion and removal tool, with sections 90P, 92P and 94P being taken on planes 90P, 92P and 94P of FIG. 7.

FIG. 9 is an exploded isometric view of a rear passage portion and retainer of another embodiment of the invention.

FIG. 10 is a partial sectional view of a rear passage portion and retainer of another embodiment of the invention.

DESCRIPTION OF THE PREFERRED EMBODIMENTS

FIG. 1 illustrates an optical connector 10 of the invention, which includes a frame 12 with a plurality of passages 4 extending along passage axes 16. As shown in FIG. 2, the frame includes a main or front frame part 20 that forms main passage portions 21 and a rear frame part in the form of a plate 22. The parts are held together by fasteners that are not shown. A terminus 30 lies in the rear passage portion 31 of each passage 14. Each terminus includes a ferrule-body assembly 32 that includes a ferrule 34 that is usually formed of a ceramic and a body 36 that is usually formed of metal and that attaches to the ferrule. The connector also includes a helical compression spring 40 that urges the ferrule-body assembly 32 forwardly F so the ferrule 34 tends to slide forwardly within a ceramic alignment sleeve 42. The ferrule has a center bore 44 that holds an optical fiber 46 of an optical fiber cable 50.

The tip 52 of the fiber can be mated to the tip of another fiber, shown in phantom lines at 54, by inserting the ferrule 56 of the mating fiber into the sleeve. The mating ferrule 56 is generally not biased forwardly, but pushes the ferrule 34 rearwardly to the position shown at 34A by slight compression of the spring. This assures that the tips of the ferrules and of the fibers therein, will firmly abut one another.

The connector includes a plurality of retainers 60 that each abuts the rear end 62 of a corresponding spring. The retainers can be inserted and removed from the rear end 64 of the connector frame for initial installation and to allow removal and replacement of a terminus if it is to be cleaned or replaced. FIG. 3 shows a retainer 60 mounted on a tubular portion 70 of the body 36. The retainer includes a sleeve portion 72 with a cylindrical outer surface portion 74 that is concentric with the axis 16 of the terminus and passage. The retainer also has a pair of projections 80, 82 that project radially outwardly from imaginary continuations of the cylindrical surface 74. In addition, the retainer has a pair of slots 84 that can receive a tool that is used for installation and removal of the retainer.

FIG. 8 contains sectional views that show how the retainer 60 is installed in the rear passage portion 31. The retainer has an initial rotational position 60A wherein its projections are spaced apart in a lateral direction L. In the initial rotational position, the retainer can be slid forwardly F through first and second passage parts 90, 92 that lie on planes 90P, 92P and into a third passage part 94 that lies on a plane 94P. This is because the first and second passage parts have recesses 100, 102 on their laterally opposite sides, that pass the projections 80, 82 during such axial sliding of the retainer. The retainer cannot slide any further forward than the third passage part because the retainer then abuts a rearwardly-facing surface 96.

When the retainer has been slid forwardly into the third passage part 94, it is first in the initial rotational position 60A wherein its projections at 80A, 82A remain at laterally opposite sides of the axis 16, and the retainer has merely been moved axially forward. At the forward initial rotational position with projection at 80A and 82A, the retainer can be rotated in the direction 110 about the axis to a lock rotational position wherein the projections lie at the positions 80B and 82B. The third passage part has recess parts such as 85 that permit the projections to rotate about the axis between the initial and lock positions. In the lock rotational position at 60B with projections at 80B and 82B, the projections have been turned 90° about the axis but still lie in the third passage part 94.

When the retainer reaches the lock rotational position 60B, the spring pushes it rearwardly so the projections lie at positions in recesses 112 that are vertically V spaced apart. With the projection in the recesses 112, the retainer lies in its lock rotational position and lies in the second passage part 92. With the retainers lying in the recesses 112, the retainers cannot move further rearward R because a shoulder 114 at the rear of the second passage part 92 prevents such rearward movement. The spring resists forward movement. The retainer cannot turn because of the side walls of recesses 112 that receive the projections. As a result, the retainer remains in the locked position until it is forced forwardly out of that position by a special tool 120 that presses against largely rearwardly-facing surfaces 85.

The retainer 60 has a pair of slots 84 at its opposite sides. The tool 120 has a pair of arms 124 that fit into the slots 84, so the tool can turn the retainer and can also push the retainer forwardly against the bias of the spring. To remove a retainer lying in the lock position, a person inserts the tool legs 124 into the slots 84, and pushes the retainer forwardly until it is stopped by the surface 96 and its projections lie at 80B, 82B. The person then turns the tool to move the projections to the initial orientation at 80A, 82A and removes the tool to allow the retainer to move rearwardly out of the passage.

FIG. 7 is a sectional view taken on line 7—7 of FIG. 8, showing where the planes 90P, 92P and 94P lie along the rear passage portion 31. The figure also shows the retainer in its final lock position at 60C, with its projections at 80C, 82C bearing against shoulder 114.

FIG. 6 shows that the cylindrical outer surface 74 may subtend less than half of the outer circumference of the retainer, so long as it has at least three locations 74L, 74M and 74N lying on the cylinders, where two locations 74M, 74N are angled E by over 180° and another location 74L lies along that angle. The cylindrical surface 74 lies closely within the largely cylindrical rear passage parts so the axis of the retainer remains coincident with on the axis of the passage. Although it is possible to use only a single projection such as 80, applicant prefers at least two projections to avoid a tendency to tilt. Each projection preferably subtends an angle of much less than 180° and preferably not more than 90° to leave room for recesses in the second passage part. The projections are preferably spaced apart by more than 90°. The projections have outer portions in the form of parts of cylinders.

FIG. 5 shows that the tubular portion 70 of each terminus body extends through the central hole 130 in the retainer 60, with the tubular portion having a rear end 132 that is flared radially outwardly to form a stop that limits its forward sliding through the retainer hole. During mating, when the front end of the assembly 32 is pushed rearward and the spring compresses, the tubular portion slides axially rearward within the retainer 60, while the retainer 60 is prevented from sliding rearward by engagement of its projections with shoulders on the rear frame plate. Although a separate stop could be fixed to the rear end of the tube, the simple outward flaring of the tube rear end minimizes the cost and required length of the terminus and spring and retainer assembly.

FIG. 2 shows the relative spacing C between the axes of two adjacent passages 14, relative to the diameter D required to receive the terminus, and relative to the maximum diameter G of the frame rear passage portion. In one example, where the diameter D is assumed to be 2 mm, the maximum diameter G of the retainer-receiving passage portion is 2.5 mm and the distance C between passages is 2.7 mm. Thus, the retainer allows the distance C between the axis of adjacent passages to be only 35% greater than the diameter D required for the terminus. The terminus does not require an extra diameter to form a clip-engaging shoulder. Where a very large number of termini must be accommodated, close spacing of the passages is important in limiting the size of the apparatus.

FIG. 9 shows sectional views of a modified passage portion 150, where only the first and third passage parts 152, 154 are provided, with no intermediate second passage part. In this case, the retainer, in the orientation 60A, is moved through the first passage part 152 into the third passage part 154 without passing through any second passage part. While in the third passage part, the retainer is turned 90° in the direction of arrow 110 to its locked position 60B so its projection moves from 80A to 80B. The projections 80 then press against locations 160 at the rear of a second passage part. In this case, the rearward force of the spring against the retainer, is relied upon to create friction to prevent turning of the retainer in a direction opposite to arrow 110. Small teeth can be provided on the surface at 160 and on the rear of the projection 80 to resist turning of the retainer opposite to arrow 110.

While the retainer 60 is useful for a terminus that includes a spring that pushes the front end of the terminus forward and pushes the retainer rearward, the retainer is useful to hold other termini, including a terminus that does not have a spring. FIG. 10 shows an apparatus 170 where the retainer 60 is used, but with a spring 172 being provided to bias the retainer rearwardly. The apparatus 170 can be used for an optical terminus that does not have a spring to bias it forwardly, and with such terminus abutting a forward surface 176 of the retainer. Such retainer and spring can be used with optical termini and with electrical termini that include electrical contacts and a cable comprising a single wire.

Thus, the invention provides a connector with passages that hold termini that connect to cables that extend rearwardly from the connector, where the connector includes retainers that retain the termini in their passages. Each retainer is spring biased rearwardly, and includes a sleeve portion with a hole lying on an axis for passing the cable. The retainer has a part cylindrical outer surface with at least one and preferably a plurality of projections that project radially outwardly beyond the radius of the cylindrical surface. A frame rear passage portion has a first part with a part-cylindrical inner surface and with at least one radially-outwardly projecting recess for passing the retainer and projection in forward axial movement at an initial rotational orientation of the retainer. The rear passage portion has a third passage part lying forward of the first passage part, with the third passage part shaped to permit rotation of the retainer about the axis from the initial orientation to a lock orientation that is angled a plurality of degrees from the initial orientation. In the lock position, the projection is out of line with the recess, to prevent rearward movement of the retainer out of the frame. The rear passage portion preferably includes a second passage part lying between the first and third parts, with the second passage part having a projection-receiving recess that receives the projection when the retainer lies in the locked position in the third passage part and is moved rearwardly into the second passage part.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical connector with a frame having front and rear ends and a plurality of passages extending between said ends, said connector including a plurality of termini that each includes a ferrule-body assembly with a rear end and with a center bore for holding an optical fiber, each ferrule-body assembly lying in a sliding fit in one of said passages, and a plurality of springs that each pushes a ferrule-body assembly forwardly, including:

a plurality of spring retainers for abutting rear ends of said springs to prevent retainer rearward movement, each retainer having an axis, a hole lying on said axis, and a radially outer surface which includes at least one radially outwardly projecting projection;

said frame rear end having a frame rear passage portion at the rear of each passage, with each rear passage portion having a first passage part that passes said retainer in forward axial movement at only an initial rotational orientation of said retainer, with said first passage part having a radially-outwardly extending first recess for passing said projection;

each rear passage portion having an additional passage part that receives the corresponding retainer in forward axial movement therein and that permits rotation of said retainer about said axis between said initial position and a lock rotational position that is angled a plurality of degrees from said initial rotational position, wherein in said lock position said projection is out of line with said recess.

2. The connector described in claim 1 wherein:

each of said retainer outer surfaces is a largely cylindrical surface with said at least one projection projecting radially outward from said cylindrical surface;

each first rear passage part is largely cylindrical but with at least one radial recess therein that passes said at least one projection during axial passage of said retainer therethrough.

3. The connector described in claim 1 wherein:

each of said retainers has a rear surface with a plurality of slots therein that extend axially forward from said rear surface and that lie axially within said cylindrical surface, to receive a wrench that is inserted forwardly through said first passage part to turn and push said retainer.

4. The connector described in claim 1 wherein:

said at least one projection of each retainer includes a plurality of projections spaced about said sleeve outer surface, including first and second projections spaced apart by more than 90° about said axis.

5. The connector described in claim 1 wherein:

said frame has a front frame part forming main passage portions that each extends along most of the length of each of said passages, and said frame has a rear frame plate that forms said frame rear passage portions;

each of said main passage portions has a rear end that lies at the front end of one of said rear passage portions and that has a cylindrical shape of a diameter that prevents movement of the retainer forwardly into said main passage portion rear end.

6. A connector that includes a frame with front and rear ends and at least one passage extending along an axis between said ends, said passage constructed to receive a terminus for holding the front of a cable that extends rearwardly through said passage and rearward of said frame, comprising:

a retainer for preventing rearward movement of said terminus, said retainer mounted on said frame rear end and being biased rearwardly, said retainer including a sleeve portion with a hole lying on said axis for passing said cable and including a part cylindrical outer surface with a plurality of radially outwardly projecting projections that project radially outward further than said cylindrical outer surface;

said passage having a rear passage portion with a first passage part that has a part-cylindrical inner surface with a plurality of radially outwardly projecting recesses for passing said retainer in axial movement therethrough at only an initial orientation of said retainer;

said frame rear portion having an additional passage part lying forward of said first passage part and shaped to permit rotation of said retainer about said axis from said initial orientation to a second rotational orientation wherein said projections are out of line with said recesses to prevent rearward movement of said retainer.

7. The connector described in claim 6 wherein:

said retainer has a rear portion with a non-circular part to receive a wrench to turn the retainer and with said rear portion having a rearwardly-facing surface to enable the wrench to push the retainer forwardly.

8. The connector described in claim 6 wherein:

said projections each has a radially outer portion in the shape of part of a cylinder.

9. An optical connector with a frame having front and rear ends and a plurality of passages extending between said ends, said connector including a plurality of termini that each includes a ferrule-body assembly with a rear end and with a center bore for holding an optical fiber, the ferrule-body assembly of each terminus lying in a sliding fit in one of said passages, and said connector including a plurality of spring that each pushes one of said ferrule-body assemblies forwardly, comprising:

a plurality of spring retainers abutting rear ends of said springs to prevent their rearward movement, each retainer including a sleeve portion with a hole lying on a retainer axis for passing an optical fiber and with a sleeve portion outer surface, each retainer also having a plurality of projections that project radially outward at said sleeve outer surface;

said frame rear end having a plurality of rear passage portions that each has a first passage part that passes said sleeve portion and said projections in forward and rearward axial movement therethrough when said projections lie in an initial rotational position;

each of said frame rear passage portions having a third passage part lying forward of a corresponding one of said first passage parts and shaped to receive a retainer moving axially forward therein and to permit said sleeve portion and said projections to turn by a plurality of degrees about said axis from said initial position to a lock position and from said lock position to said initial position, while the retainer lies in the third passage part;

each of said rear passage portions having a second passage part lying axially between said first and third passage parts and shaped to receive said sleeve portion and projections in rearward axial movement only when said projections lie in said lock position, with said second passage part having projection-receiving recess walls that prevent rotation of said projections to turn said retainer from said lock position back to said initial position, and that limit rearward movement of said projections.

10. An optical connector with a frame having front and rear ends and a plurality of passages extending between said ends, said connector including a plurality of termini that each includes a ferrule-body assembly with a rear end and with a center bore for holding an optical fiber, each ferrule-body assembly lying in a sliding fit in one of said passages, and a plurality of springs that each pushes a ferrule-body assembly forwardly, including:

a plurality of spring retainers for abutting rear ends of said springs to prevent retainer rearward movement, each retainer having an axis, a hole lying on said axis, and a radially outer surface which includes at least one radially outwardly projecting projection;

said frame rear end having a frame rear passage portion at the rear of each passage, each rear passage portion having first, second and third passage parts, each of said first passage parts passes a corresponding retainer in forward axial movement at only an initial rotational orientation of said retainer, and each first passage part having a radially-outwardly extending first recess for passing said projection;

each of said third passage parts receives the corresponding retainer in forward axial movement therein and permits rotation of said retainer about said axis between said initial position and a lock rotational position that is angled a plurality of degrees from said initial rotational position, wherein in said lock position said projection is out of line with said recess;

each of said second passage parts lying axially between said first and third rear passage parts, said second passage part being shaped to pass said retainer in axial movement therethrough in said initial position of said retainer, and said second passage part being shaped to receive said sleeve portion and said at least one projection in rearward axial movement of said retainer from said third rear passage part, only when said retainer is in said lock retainer position;

each second passage part having a projection-receiving second recess with circumferentially opposite walls that prevent rotation of said at least one projection, and said second passage part having a largely forwardly-facing shoulder at a rear end of said second recess with said shoulder lying directly rearward of said projection in said lock rotational position of said retainer.

11. An optical connector with a frame having front and rear ends and a plurality of passages extending between said ends, said connector including a plurality of termini that each includes a ferrule-body assembly with a rear end and with a center bore for holding an optical fiber, each ferrule-body assembly lying in a sliding fit in one of said passages, and a plurality of springs that each pushes a ferrule-body assembly forwardly, including:

a plurality of spring retainers for abutting rear ends of said springs to prevent retainer rearward movement, each retainer having an axis, a hole lying on said axis, and a radially outer surface which includes at least one radially outwardly projecting projection;

said frame rear end having a frame rear passage portion at the rear of each passage, with each rear passage portion having a first passage part that passes said retainer in forward axial movement at only an initial rotational orientation of said retainer, with said first passage part having a radially-outwardly extending first recess for passing said projection;

each rear passage portion having an additional passage part that receives the corresponding retainer in forward axial movement therein and that permits rotation of said retainer about said axis between said initial position and a lock rotational position that is angled a plurality of degrees from said initial rotational position, wherein in said lock position said projection is out of line with said recess;

each of said ferrule-body assemblies includes an elongated tube that extends rearwardly through the hole in one of said retainers and that is slideable in the hole, and that has a rear end forming a stop that prevents sliding of said tube forwardly out of the retainer.

12. The connector described in claim 11 wherein:

each of said tube rear ends is outwardly flared to form the stop.

13. A connector that includes a frame with front and rear ends and at least one passage extending along an axis between said ends, said passage constructed to receive a terminus for holding the front of a cable that extends rearwardly through said passage and rearward of said frame, comprising:

a retainer for preventing rearward movement of said terminus, said retainer mounted on said frame rear end and being biased rearwardly, said retainer including a sleeve portion with a hole lying on said axis for passing said cable and including a part cylindrical outer surface with a plurality of radially outwardly projecting projections that project radially outward further than said cylindrical outer surface;

said passage having a rear passage portion with first, second and third passage parts, said first passage part having a part-cylindrical inner surface with a plurality of radially outwardly projecting recesses for passing said retainer in axial movement therethrough at only an initial orientation of said retainer;

said third passage part lying forward of said first passage part and shaped to permit rotation of said retainer about said axis from said initial orientation to a second rotational orientation wherein said projections are out of line with said recesses to prevent rearward movement of said retainer;

said second passage part lying axially between said said first and third passage parts, with said second passage part having a through hole lying on said axis with said through hole being about the same shape as said first passage part to pass said said retainer therethrough in said initial rotational position of said retainer, but with said second passage part having forwardly-opening recesses that receives said projections during rearward axial movement of said retainer from said third passage part, in said lock rotational position of said retainer.

* * * * *